(12) United States Patent
Brinkhuis et al.

(10) Patent No.: US 7,576,151 B2
(45) Date of Patent: Aug. 18, 2009

(54) AMINO ACID DERIVATIVES AND THEIR USE AS A SAG CONTROL AGENT

(75) Inventors: Richard Hendrikus Gerrit Brinkhuis, Zwolle (NL); Rudolf Anthonius Maria VenderBosch, Duiven (NL)

(73) Assignee: Nuplex Resins, B.V., Bergen Op Zoom (NL)

( * ) Notice: Subject to any disclaimer, the term of this patent is extended or adjusted under 35 U.S.C. 154(b) by 293 days.

(21) Appl. No.: 10/564,041

(22) PCT Filed: Jul. 8, 2004

(86) PCT No.: PCT/EP2004/007602

§ 371 (c)(1),
(2), (4) Date: May 10, 2006

(87) PCT Pub. No.: WO2005/005558

PCT Pub. Date: Jan. 20, 2005

(65) Prior Publication Data

US 2006/0223954 A1    Oct. 5, 2006

Related U.S. Application Data

(60) Provisional application No. 60/543,387, filed on Feb. 11, 2004.

(30) Foreign Application Priority Data

| Jul. 8, 2003 | (EP) | .................................. 03077152 |
| Feb. 3, 2004 | (EP) | .................................. 04075341 |

(51) Int. Cl.
*C08K 5/21* (2006.01)
*C08K 5/16* (2006.01)
*B32B 27/18* (2006.01)
*B32B 27/20* (2006.01)

(52) U.S. Cl. ........................ 524/212; 524/186; 524/210; 524/211; 524/213; 524/218; 524/219; 524/220; 524/227

(58) Field of Classification Search ...................... None
See application file for complete search history.

(56) References Cited

U.S. PATENT DOCUMENTS

| 4,311,622 A | 1/1982 | Buter ........................ 260/18 |
| 2002/0082324 A1 | 6/2002 | Van Heugten et al. ....... 524/212 |
| 2003/0100626 A1* | 5/2003 | Sapper et al. ................. 522/79 |
| 2006/0155021 A1* | 7/2006 | Lenges et al. ............... 524/211 |
| 2006/0155146 A1* | 7/2006 | Lenges et al. ................. 564/32 |

FOREIGN PATENT DOCUMENTS

| JP | 05-017707 | * | 1/1993 |
| JP | 08-071406 | * | 3/1996 |
| JP | 2003 183583 | | 11/2003 |

OTHER PUBLICATIONS

Abstract of JP 08-071406, Patent Abstracts of Japan (1996).*
Machine translation of JP 05-017707, provided by the JPO website (1993).*
International Search Report and the Written Opinion of the International Searching Authority, Mailed Nov. 4, 2004, for International Application No. PCT/EP2004/007602 (9 Pages Total).

* cited by examiner

*Primary Examiner*—Michael J Feely
(74) *Attorney, Agent, or Firm*—Howrey LLP

(57) ABSTRACT

The invention relates to the use as a sag control agent (SCA) in coating compositions of a rheology modification agent obtainable by reacting one or more polyisocyanates with one or more derivatives of optically active amino acids.

14 Claims, No Drawings

AMINO ACID DERIVATIVES AND THEIR USE AS A SAG CONTROL AGENT

This application is a §371 U.S. national phase application of International Application Number PCT/EP2004/007602, filed Jul. 8, 2004, and claims priority to European Application No. 03077152.1, filed Jul. 8, 2003; European Application No. 04075341.0, filed Feb. 3, 2004; and U.S. Provisional Application No. 60/543,387, filed Feb. 11, 2004, the entire contents of which are incorporated by reference herein.

The invention relates to the use as sag control agent (SCA) in coating compositions of rheology modification agents obtainable by reacting one or more polyisocyanates with one or more optically active amino acid derivatives.

Bis-urea-type gelation agents based on diisocyanate and amino acids have been mentioned in the literature. For example, L. A. Estroff and A. D. Hamilton in *Angew. Chem. Int. Ed.*, 2000, Vol. 39, No. 19, pp. 3447-3450, disclose bis-urea-type hydrogelators based on a linear alkyl diisocyanate and L-glutamic acid monoester. Similarly, A. J. Carr, R. Melendez, S. J. Geib, and A. D. Hamilton in *Tetrahedron Letters*, 1998, Vol. 39, pp. 7447-7450, disclose bis-urea-type gelators based on xylylene-1,4-diisocyanates and tert-butyl esters of L-alanine, L-phenylalanine, and L-valine. These bis-urea compounds form gels in a variety of organic solvents.

The use of SCAs in coating compositions is also well-known. For example, U.S. Pat. No. 4,311,622 discloses thixotropic coating compositions prepared from a binder and a sag control agent which is the reaction product of a diisocyanate and a mono-amine or hydroxy monoamine. Similarly, EP-A-0 261 863 discloses fluidity controlling agents for paints which give thixotropic properties to a coating film when it is applied to the paint and produce hardly any sagging in the formation of thick coating films.

JP 2003/183583 discloses an anti-sag agent for a non-aqueous coating material composed of a polyamide, a polyester or a polyurethane, which can be obtained by reacting a dimerised fatty acid with dimethyl- or diethyl amino groups.

US2002/082324 discloses a thixotropic amino formaldehyde resin obtainable by reacting a poly-isocyanate functional compound to a monoamine functional compound or reversely a mono-isocyanate functional compound to a polyamine functional compound in the presence of the amino formaldehyde resin to form the urea functional compound entangled to the resin.

The demands for successful use of a rheology modification agent as sag control agent in coating compositions are extensive. Preferably, a sag control agent is able to combine low viscosities at high and medium shear stress (>5 Pa) with high viscosity at shear stresses corresponding to those created by gravity in wet coating layers on non-horizontal substrates (<1 Pa), the thixotropic character needs to show a time-dependent viscosity recovery after spraying in a specific window in order to combine effective anti-sagging behaviour with good levelling performance, and the variation of this character with solvent level, layer thickness or substrate angle with the vertical needs to be favourable to create robustness with respect to the sag-levelling balance. When the rheological structure is cured in a coating formulation, its stability must be maintained in the curing cycle, so as to maintain good control over sagging while allowing the best overall levelling. The amount of solvent needed to allow application, e.g. by spraying, should not be raised excessively by the presence of a sag control agent. Moreover, any rheology controlling agent used must have a rheological performance that allows storage over time without irreversible change.

Apart from the Theological performance, also the optical performance (the effect on coating appearance other than through sagging or levelling) is of utmost importance. This implies that any sag control additive must be fine enough not to create any visible disturbance (like protruding out of the film) when applied in thin films. Especially for clear coat applications, it also implies that no detectable haze or turbidity should be present after completion of the curing cycle, and also that no colour formation should have resulted from its presence. Again, also these characteristics should not change irreversibly with storage time. Of course, in order to limit costs and not interfere with other coating properties, efficient sag control agents that can do their job at low concentrations would be preferred.

Though many rheology control agents are known, few can fulfil all the demands listed above. Especially for applications in coating compositions in which relatively low curing temperatures (e.g. below 100° C.) are used and formulations that do not contain formaldehyde derived curing agents or additives (as, e.g., in broadly used isocyanate-polyol curing systems or systems based on acryloyol-functional resins to be cured through radical chemistry), there is a need for good sag control agents combining efficient anti-sagging behaviour with perfect optical properties.

Surprisingly, we have found that a specific class of urea compounds is able to deliver the Theological and optical performance over a wide temperature range that is needed for use as an SCA in coating compositions.

Accordingly, the present invention relates to the use as an SCA in coating compositions of a rheology modification agent obtainable by reacting one or more polyisocyanates with one or more optically active amino acids, esters and/or salts thereof of the formula (I)

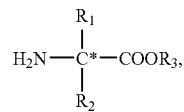

not being a racemic mixture, wherein each of $R_1$, $R_2$, and $R_3$ is independently selected from hydrogen and linear, cyclic, or branched, substituted or unsubstituted, saturated or unsaturated hydrocarbyl, or heteroatom containing group, with each of $R_1$ and $R_2$ being different such that the carbon atom C* is a chiral centre. Hereinafter, "amino acids, esters and/or salts thereof" are also referred to as "amino acid derivatives".

By the feature "use as an SCA in coating compositions" is meant a method to male coating compositions having the desired sag control properties involving the step of incorporating a rheology modification agent of the present invention. Preferably, the SCA that is used in said step is a rheology modification agent obtainable by reacting a conventional polyisocyanate with an optically active amino acids ester of the formula (I)

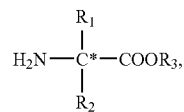

wherein $R_1$, $R_2$, and $R_3$ are as defined above.

Particularly preferred SCAs according to the first embodiment of the invention are obtained if one or more optically active amino acid derivatives are reacted with one or more polyisocyanates selected from the group consisting of substituted or unsubstituted linear aliphatic polyisocyanates with an even number of carbon atoms in the chain between two isocyanate groups (as well as their dimeric derivatives such as uretdiones and corresponding trimeric isocyanurates or biurets), substituted or unsubstituted aryl, aralkyl, and cyclohexylene polyisocyanates.

Optionally, a small amount of one or more additional compounds that may influence the crystallisation properties of the final product, such as reactive amino acid derivatives that differ from the main compounds in the SCA and/or other amines (including polyfunctional amines), or a deviating isocyanate reactant may be present during the reaction to prepare a rheology modification agent for use as an SCA. Particularly preferred amino acid derivatives for that purpose are

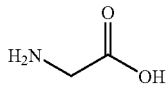

glycine (Gly),

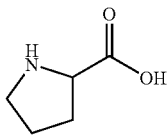

proline (Pro), and esters thereof.

The use of the prefix "poly" for polyisocyanates indicates that at least two of the mentioned functionalities are present in the respective "poly" compound. It is noted that when a polyurea product, i.e. the reaction product of amino acid esters with a polyisocyanate, is prepared, it is preferred to prepare a diurea or a triurea product.

In a preferred embodiment of the invention wherein polyurea products are prepared, it is possible to prepare polyurea products with the general formulae X-[urea-chiral centre]$_n$, X being the linking group of the molecule and n being the number of [urea-chiral centre] moieties (n is 2 or more), preferably wherein n is 2-5, more preferably wherein n is 2 or 3, most preferably wherein n is 2.

It is noted that in this description the general term "rheology modification agent(s)" is used to indicate suitable rheology modification agents for use as an SCA in coating compositions.

It is also noted that although at least one optically active amino acid derivative is used, the final reaction product obtained is not necessarily optically active. The final product may be in the d-, l- and/or meso-form.

If $R_1$ and/or $R_2$ of formula (I) is a hydrocarbyl, the hydrocarbyl is preferably independently selected from the group consisting of linear, cyclic or branched, substituted or unsubstituted, saturated or unsaturated, optionally hetero atom-containing $C_1$-$C_{24}$ alkyl, aryl, aralkyl, and alkenyl, fulfilling the above-mentioned provisos, more preferably selected from the group consisting of linear or branched $C_1$-$C_{24}$ alkyl, even more preferably from the group consisting of linear or branched $C_1$-$C_4$ alkyl, and most preferably the hydrocarbyl is a methyl or ethyl group.

In a preferred embodiment, one of $R_1$ and $R_2$ is hydrogen and the other is a hydrocarbyl selected from one of the above-indicated $C_1$-$C_{25}$ groups. If $R_1$ and/or $R_2$ is a hetero atom-containing $C_1$-$C_{25}$ group, it is preferably in the form of an ether unit. Optionally, $R_1$ and $R_2$ can be taken together with the chiral carbon atom C* to which they are attached and form a substituted or unsubstituted ring containing 4 to 8 carbon atoms, provided that said ring is such that chirality at the carbon atom C* is maintained.

If present, the substituents on $R_1$ and/or $R_2$ and on the above-mentioned ring are preferably selected from the group consisting of alkyl, aryl, alkoxy, hydroxy, (preferably non-primary) amine, carboxylic acid, ester, phosphonic acid, phosphonic ester, keto, ketimine, urethane, allophanate, amide, thiol, imidazole, indole, guanidine, alkyl sulphide, and urea groups, most preferably from alkyl or alkoxy groups.

If $R_3$ is a hydrocarbyl as defined above, it is preferably selected from the group consisting of linear, cyclic or branched, substituted or unsubstituted, saturated or unsaturated, optionally hetero atom-containing $C_1$-$C_{25}$ alkyl, aryl, aralkyl, and alkenyl; more preferably, $R_3$ is selected from the group consisting of linear or branched, substituted or unsubstituted, optionally hetero atom-containing $C_1$-$C_{25}$ alkyl, even more preferably from the group consisting of linear or branched, substituted or unsubstituted $C_1$-$C_8$ alkyl, ether and/or, optionally esterified $C_1$-$C_8$ (poly)alkoxy, and most preferably from the group consisting of linear $C_1$-$C_4$ alkyl and, optionally alkoxylated, linear $C_1$-$C_4$ alkoxy. If alkoxylated, it is preferred to use ethoxylated, propoxylated, and/or butoxylated compounds.

If present, the substituents on $R_3$ are preferably selected from the group consisting of monoether alcohol and alkoxylated compounds.

In a preferred embodiment the rheology modification agent according to the invention is obtained by reacting one or more polyisocyanates with one or more optically active amino acid derivatives of formula (I), preferably in their naturally occurring configuration, selected from the group consisting of:

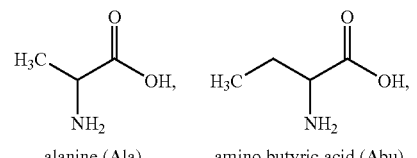

alanine (Ala)   amino butyric acid (Abu)

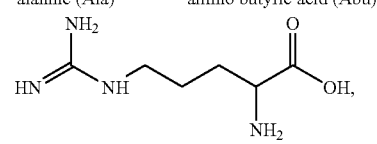

arginine (Arg)

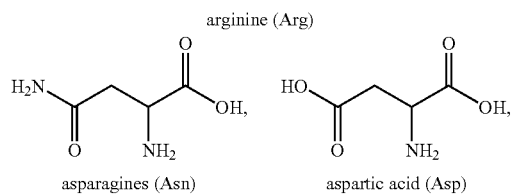

asparagines (Asn)   aspartic acid (Asp)

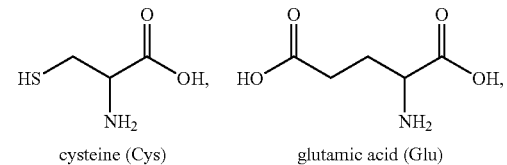

cysteine (Cys)   glutamic acid (Glu)

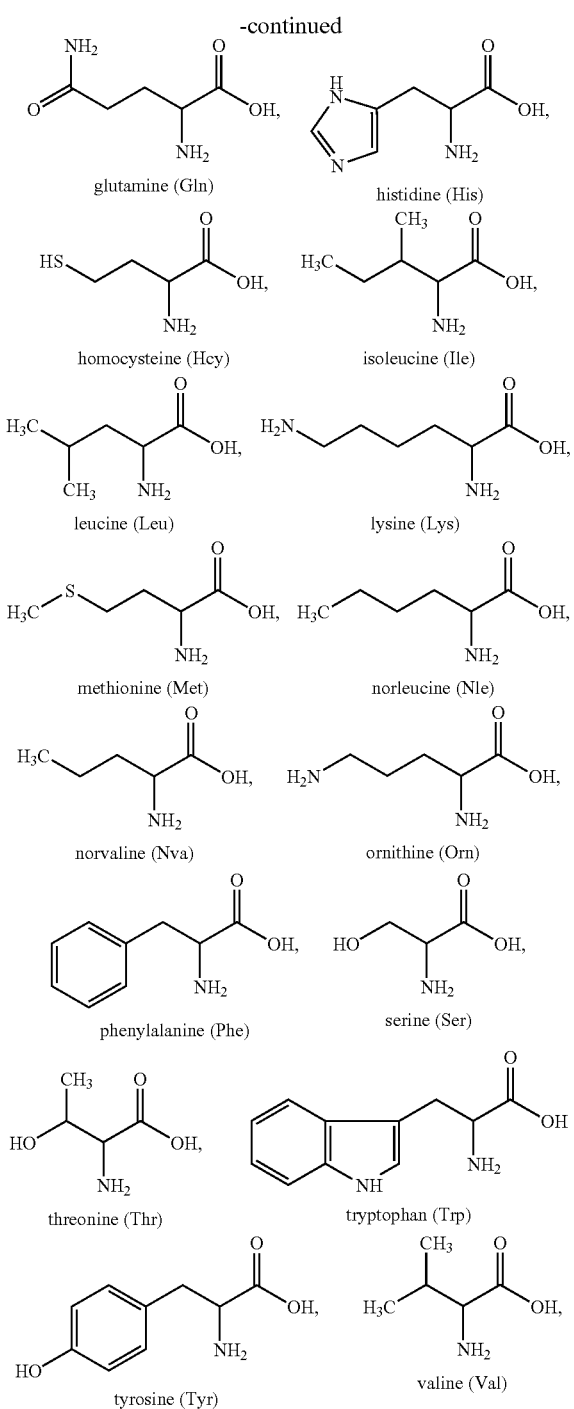

ester derivatives and salts thereof.

The polyisocyanates are preferably selected from the group consisting of aliphatic, cycloaliphatic, aralkylene, and arylene polyisocyanates, more preferably from the group consisting of substituted or unsubstituted linear aliphatic polyisocyanates with an even number of carbon atoms in the chain between two isocyanate groups (and their isocyanurates, biurets, uretdiones) and substituted or unsubstituted arylene, aralkylene, and cyclohexylene polyisocyanates. The polyisocyanate usually contains 2 to 40 and preferably 4 to 8 carbon atoms. The polyisocyanate preferably contains at most four isocyanate groups, more preferably at most three isocyanate groups, and most preferably two isocyanate groups. It is even more preferred to use a symmetrical aliphatic or cyclohexylene diisocyanate. Suitable examples of diisocyanates are preferably selected from the group, consisting of tetramethylene-1,4-diisocyanate, hexamethylene-1,6-diisocyanate (HMDI), ω,ω'-dipropylether diisocyanate, thiodipropyl diisocyanate, trans-cyclohexyl-1,4-diisocyanate, dicyclohexylmethane-4,4'-diisocyanate, 1,5-dimethyl-(2,4-ω-diisocyanato methyl)benzene, 1,5-dimethyl(2,4-ω-diisocyanatoethyl)benzene, 1,3,5-trimethyl(2,4-ω-diisocyanatomethyl)benzene, 1,3,5-triethyl(2,4-ω-diisocyanatomethyl)benzene, meta-xylylene diisocyanate, para-xylylene diisocyanate, dicyclohexyl-dimethylmethane-4,4'-diisocyanate, 2,4-toluene diisocyanate, 2,6-toluene diisocyanate, and diphenylmethane-4,4'-diisocyanate (MDI). Further suitable polyisocyanates are preferably selected from the group consisting of polyisocyanates based on HMDI, including condensed derivatives of HMDI, such as uretdiones, biurets, isocyanurates (trimers), and asymmetrical trimers, etc., many of which are marketed as Desmodur® N and Tolonate® HDB and Tolonate® HDT, and polyisocyanates known as "polymeric MDI". Polymeric MDI typically is a mixture of pure MDI and oligomers of MDI. Particularly preferred polyisocyanates are selected from the group consisting of HMDI, its isocyanurate trimer, its biuret, trans-cyclohexyl-1,4-diisocyanate, meta-xylylene diisocyanate, and toluene diisocyanate. Most preferably, HMDI is selected.

Substituted polyisocyanates are typically formed by reaction of linear polyisocyanates to form dimers and/or trimers.

As will be understood by the person skilled in the art, it is also possible to use conventionally blocked polyisocyanates which generate two or more isocyanates in situ, as long as the blocking agent, after splitting, does not prevent the formation of the rheology modification agent according to the invention. Throughout this document the term "polyisocyanate" is used to denominate all polyisocyanates and polyisocyanate-generating compounds.

It is noted that it is also possible to react one or more optically active amino acid derivatives with one or more optically active (poly)isocyanates. However, for economic reasons, such a process and the resulting rheology modification agents are less preferred.

In the reaction between the one or more isocyanates and the one or more amino acid derivatives for the preparation of the rheology modification agent it is preferred that either the isocyanate or the amino acid derivative is used in excess instead of using stoichiometric amounts. For example, the ratio of the number of amino groups of the amino acid derivative to the number of (generated) isocyanate groups may be in the range of 0.7 to 1.5. Preferably, the ratio is about 0.9 to 1.1.

It is to be understood that any non-racemic enantiomer mixture of chiral amino acid derivatives can be used to make a rheology modification agent according to the invention, provided that this mixture contains optically active amino acid derivative according to the invention. In this description the term "enantiomeric excess", hereinafter also referred to as "ee", is used to indicate the excess of one enantiomer over racemic material in a sample that comprises both enantiomers of the chiral compound. The enantiomeric excess is expressed as a percentage: A racemic sample, i.e. a 50:50 mixture of both enantiomers, has an ee of 0% and an enantiomerically pure sample has an ee of 100%. It is noted that although use should not be made of a 50:50 ratio of two enantiomers, optimum results may very well be obtained when the ratio of two enantiomers is not 100:0. In other words, the ee of the enantiomeric mixture should not be 0%. The ee preferably is at least 10% (as in 55:45 ratio), more preferably at least 20% (as in 60:40 ratio), even more preferably at least 40% (as in 70:30 ratio), and most preferably at least 50% (as in 75:25 ratio).

In one embodiment of the invention preferably use is made of a mixture of enantiomers with an ee of at least 55%, most preferably at least 75%, since in this embodiment the use of significant enantiomeric excess of just one enantiomer, i.e. an ee of at least 55%, results in a rheology modification agent with improved rheology control properties.

The reaction between the isocyanate and the amino acid derivative can be carried out in any arbitrarily chosen way by combining the reaction components, optionally at elevated temperature, as will be clear to a person skilled in the art. It is preferred that the reaction is carried out at temperatures in the range of 0° C. to 150° C., more particularly in the range of 20° C. to 80° C. Although in general the reaction components are combined in any arbitrarily chosen manner, preferably the isocyanate is added to the amino acid derivative, which may be done in several steps, if desired. Optionally, the reaction may be carried out in the presence of an inert solvent, for example acetone, methyl isobutyl ketone, N-methyl pyrrolidone, benzene, toluene, xylene, or an aliphatic hydrocarbon such as petroleum ether, alcohols, and water, or mixtures thereof. Here the term "inert" indicates that the solvent does not interfere in the process of polyurea formation, which means that the amount of polyurea formed when solvent is present is at least 80% of the amount produced when no solvent is present.

The preparation of the rheology modification agent optionally may also be carried out in the presence of a binder. This can be done by mixing a mixture of the binder and the isocyanate with the amino acid derivative or by mixing the isocyanates with a mixture of the binder and the amino acid derivative, or by mixing two mixtures of binder with amino acid derivative and NCO, respectively. It will be obvious that if the binder is highly reactive with either the amino acid derivative or the isocyanate, the binder and that particular susceptible compound cannot be premixed. By the term "highly reactive" is meant here that more than 30% of the susceptible amino acid derivative or isocyanate reacts with the binder before the amino acid derivative and the isocyanate are mixed in order to prepare the rheology modification agent. The mixing operation may be carried out in any convenient manner, with the reactants being vigorously stirred. Amino acid derivative may be added to isocyanate or isocyanate may be added to amino acid derivative, whichever is most convenient. If a binder is used and either the amino acid derivative or the isocyanate is highly reactive with the binder, then the compound that is most reactive with the binder is preferably added to the mixture of the binder with the compound that is least reactive with the binder.

In one embodiment of the invention, the rheology modification agent is produced in the binder or curing component of the final coating composition in such a low concentration, preferably 0.1-8%, that the binder dispersion can still be handled as a fluid and can be subsequently used in the coating composition, optionally using further binder, curing component and/or other (conventional) additives. When the rheology modification agent is produced in the binder, it is preferably prepared at a temperature in the range of 20-80° C., under adequate stirring.

In another embodiment of the preparation of the rheology modification agent, the binder is mixed with such amounts of the isocyanate and the amino acid derivative that upon conclusion of the reaction a mixture is obtained as a solid-like material, which can be used as master batch of the rheology modification agent, consisting of 5-99, preferably 6-50, more preferably 7-25, parts by weight of the rheology modification agent relative to 95-1, preferably 94-50, more preferably 93-75, parts by weight of the binder. Optionally, further diluents or adjuvants may be present. The binders in the final coating composition and in the master batch of the rheology modification agents may be of the same or different composition. The preferred concentrates are suitably prepared in an atmosphere of inert gas at a temperature in the range of 20-80° C., with the amino acid derivative first being added to a binder material and, after the mixture has been homogenised, the isocyanate being slowly added to the mixture, with stirring.

Although it is less desired, binder or curing compositions comprising the rheology modification agent may also be prepared in the presence of said rheology modification agent or by preparing the binder or curing compound as well as the rheology modification agent at the same time. The skilled person will have no problem combining the rheology modification agent, or the starting materials for a rheology modification agent, with the starting materials for the binder or curing compound, with subsequent reaction to form the rheology modification agent-containing binder or curing compositions.

If the rheology modification agent is not prepared in the binder or curing compound, it can be mixed, preferably as a concentrated solution, with one or more of the components of the coating composition, preferably the binder or any other liquid component, as a result of which a fine dispersion is obtained. The mixtures of the preferred embodiment preferably form a dispersion of the rheology modification agent in the liquid component, such as the binder, which can be solventless, solvent based, or water based.

The invention further relates to coating compositions comprising a binder and the rheology modification agent according to the invention. When the rheology modification agent is used to formulate coating compositions, the resulting coating compositions show an improved rheology, here dubbed thixotropic, and may have an opaque, opalescent or even transparent appearance, depending on the size and the refractive index of the dispersed particles of the rheology modification agent.

Optionally, conventional additives may be present in any of the coating compositions of the present invention, such as solvent and/or dispersing additives, pigment dispersants, dyes, pigments, UV curing additives, flow additives, other rheology control additives, solvents, and accelerators for the curing reaction, for instance acidic compounds such as p-toluene sulphonic acid or blocked products thereof. The coating compositions may comprise other conventional rheology modification agents which may be solvent based or solventless. In another embodiment, the liquid other conventional rheology modification agents are water based.

The thixotropic coating compositions may be applied to a substrate in any desired manner, for instance by rolling, pneumatic or electrostatic spraying, brushing, sprinkling, casting, and dipping.

The degree to which the rheology of the compositions in which the present rheology modification agents are used is changed, depends, inter alia, on the proportion of rheology modification agent and the nature of the rheology modification agent and the components of the composition. As a rule, the desired degree of thixotropy may be obtained by employing the rheology modification agent preferably in an amount of at least 0.01%, more preferably at least 0.05%, even more preferably at least 0.10%, and most preferably at least 0.15%, and preferably of at most 30%, more preferably at most 10%, even more preferably at most 3%, and most preferably at most 1.5%, based on the total weight of the composition.

The thixotropic compositions according to the invention may contain polar and/or non-polar solvents. Preferably, the thixotropy is present not only at room temperature but also at elevated temperature, so that the rheology modification agent according to the invention is suitable for use at room temperature and in baking paints (curing), for instance in the range of 50° C. to 250° C., preferably less than 125° C., more preferably less than 100° C., over a period of 2 to 120 minutes.

The rheology modification agent used as an SCA according to the invention further has the considerable advantage that it does not or seldom decreases the gloss or brightness of the composition, especially for clear coats.

The rheology modification agents are preferably used in isocyanate based coating compositions, polyol based coating compositions, acryloyl based coating compositions, epoxy curable coating compositions, and dual curable coating compositions, the latter also referred to as hybrid curable coating compositions. A dual curable coating composition is, for example, a combination of a UV curable acryloyl based system and a chemically curable isocyanate based system, wherein the two curable systems may be cured in random order and the isocyanate may be cured at a temperature in the range of room temperature up to 140° C.

The rheology modification agents were found to be particularly suited to improve the rheology in conventional isocyanate-reactive two-component (2K) coating systems cured with one or more polyol compounds, thiol compounds and/or amine-functional compounds such as Desmophen® NH 1220, Desmophen® NH 1420, and Desmophen® NH 1521, at a temperature of at least 25° C. and below 150° C., preferably below 125° C., more preferably below 100° C. In addition, the rheology modification agents were also found to be particularly suited to improve the rheology of formulations based on acryloyl-functional compounds cured in a conventional way, for example through a radical mechanism as in the case of most UV- or EB-curing formulations.

The invention is elucidated by the following examples.

EXAMPLES 1-3 AND COMPARATIVE EXAMPLE A

| | |
|---|---|
| Setalux ® 1767 VV-65 | acrylic polyol ex Akzo Nobel |
| Alanine butyl ester/HDI | Alanine butyl ester/hexamethylene diisocyanate |
| Setal ® 166 SS-80 | polyester polyol ex Akzo Nobel |
| Tinstab ® BL 277 | ex Akcros Chemicals |
| Baysilon ® OL-17 | ex Bayer AG |
| Byk ® 306 | ex Byk-Cera BV |
| Tinuvin ® 1130 | ex Ciba Specialty Chemicals |
| Tinuvin ® 292 | ex Ciba Specialty Chemicals |
| Tolonate ® HDT 90 | aliphatic poly-isocyanate ex Rhodia |
| Vestanat ® T1890 | poly-isocyanate ex Huels |

Four paint formulations (comparative formulation A and formulations 1-3 according to the invention) were prepared (see Table I). The paints were sprayed onto a vertical tin-plated plate with 13 holes of 1 cm diameter and vertically baked at the indicated schedule. The sagging limit was determined as the layer thickness between the hole at which sagging occurs and the preceding hole. Another way to measure sagging is to measure the layer thickness at the point where the length of the tear is 1 cm.

These examples show that the rheology modification agent according to the invention has good activity as sag control agent and excellent transparency in the clear coats. Also at 24 min. 140° C., 60 min. 60° C., and drying for seven days at room temperature clear coats applied on glass are completely clear. The transmission (in %) of the clear coats on glass with a film thickness of 40 micron was measured using the ColorQuest spectrophotometer of Hunterlab. If the transmission values are mutually compared, a lower transmission value means more haze and less transparency.

TABLE I

| | Example | | | |
|---|---|---|---|---|
| | A | 1 | 2 | 3 |
| Setalux ® 1767 VV-65 | 64.4 | 45.7 | 35.8 | 29.7 |
| Alanine butyl ester/HDI in Setal ® 166 SS-80 | 0 | 18.7 | 28.6 | 34.7 |
| Tinstab BL 277 (1% in butyl acetate) | 1.0 | 1.0 | 1.0 | 1.0 |
| Baysilon OL-17 (2% in butyl acetate) | 3.0 | 3.0 | 3.0 | 3.0 |
| Byk 306 | 0.5 | 0.5 | 0.5 | 0.5 |
| Tinuvin 1130 | 1.5 | 1.5 | 1.5 | 1.5 |
| Tinuvin 292 | 1.0 | 1.0 | 1.0 | 1.0 |
| Tolonate HDT 90 | 25.0 | 25.0 | 25.0 | 25.0 |
| Vestanat T1890 | 10.6 | 10.6 | 10.6 | 10.6 |
| Thin down with butyl acetate to 28 s DIN cup 4/23° C. | | | | |
| Theor. % RCA | 0 | 0.70 | 1.00 | 1.30 |
| Substrate: tin-plated steel, Stoving schedule: 45 min. 80° C. | | | | |
| Sagging limit (micron) | 50 | 61 | 75 | 76 |
| Tears of 1 cm (micron) | 61 | 85 | 103 | 106 |
| Transmission (%) | 78.2 | 78.2 | 77.8 | 78.3 |

EXAMPLES 4-18 AND COMPARATIVE EXAMPLES B-D

| | |
|---|---|
| Setal ® 166 SS-80 | polyester polyol ex Akzo Nobel |
| Setalux ® 1767 | acrylic polyol ex Akzo Nobel |
| Setalux ® 1198 | acrylic polyol ex Akzo Nobel |
| Actilane ® 890 | melamine acrylate ex Akzo Nobel |
| Resin X | resin obtained as described in Example 3 of WO02/098942 |
| Tolonate ® HDT-LV | aliphatic poly-isocyanate. ex Rhodia |
| HDI-BA | hexamethylene diisocyanate-benzyl amine |
| Amino acids | ex Aldrich |

All SCAs were prepared in situ in the host resins mentioned (See Table II), in concentrations corresponding to 3.7 wt % on solids. Coating compositions were formulated so as to obtain an SCA concentration of 1.0 to 1.2 wt %, based on total solids. For all NCO-polyol curing formulations, Tolonate® HDT-LV (Tol® HDT) was used as cross-linker in a 1:1 molar OH-NCO stoichiometry. Butyl acetate was used to dilute the formulations in order to allow measurement of their rheology property at ca. 0.8 Pas high shear viscosity. All NCO formulations cured 30 minutes 60° C.; Actilane® 890 cured at room temperature using UV light.

The viscosities were measured with a cone and plate rheometer, in controlled shear stress mode, starting at high (1,000 Pa) shear stress. Compliance was measured after high shear disturbance of the film, applying 0.5 Pa shear stress and monitoring cumulative movement as function of time. The first measurement gives a value illustrating equilibrium rheological structure, the second measurement explicitly takes into account the rate of structure recovery: low values indicate low cumulative flow.

TABLE II

| Ex. | Amino acid | Ester | Host Resin | Crosslinker | η(1 Pa)/η(1000 Pa) | J(300 s at 0.5 Pa) Pa$^{-1}$ | Clarity after cure |
|---|---|---|---|---|---|---|---|
| B | β-alanine | Butyl | Setal ® 166 SS-80 | Tol HDT | <2 | n.d. | n.d. |
| C | D,L-aspartic (racemic) | Dibutyl | Setal ® 166 SS-80 | Tol ® HDT | <2 | n.d. | n.d. |
| D | Conventional SCA: HDI-BA | | Setal ® 166 SS-80 | Tol ® HDT | 6 | 190 | Hazy |
| 4 | L-phenylalanine | Butyl | Setal ® 166 SS-80 | Tol ® HDT | 5 | 120 | Clear |
| 5 | L-phenylalanine | Methyl | Setal ® 166 SS-80 | Tol ® HDT | >3800 | 30 | Clear |
| 6 | L-phenylalanine | Methyl | Setalux ® 1767 | Tol ® HDT | n.d. (high) | n.d. | Clear |
| 7 | L-alanine | Butyl | Setal ® 166 SS-80 | Tol ® HDT | 1000 | 8 | Clear |
| 8 | L-alanine | Methyl | Setal ® 166 SS-80 | Tol ® HDT | >3800 | 8 | Clear |
| 9 | L-glutamic acid | Dibutyl | Setal ® 166 SS-80 | Tol ® HDT | 2 | 115 | Clear |
| 10 | L-glutamic acid | Diethyl | Setal ® 166 SS-80 | Tol ® HDT | 130 | 38 | Clear |
| 11 | L-glutamic acid | Dimethyl | Setal ® 166 SS-80 | Tol ® HDT | 4.5 | 61 | Clear |
| 12 | L-glutamic acid | Dibutyl | Setalux ® 1198 | Tol ® HDT | n.d. (high) | n.d. | Clear |
| 13 | L-aspartic | Dimethyl | Setal ® 166 SS-80 | Tol ® HDT | 4 | 61 | Clear |
| 14 | L-aspartic | Dibutyl | Setal ® 166 SS-80 | Tol ® HDT | 440 | 3 | Clear |
| 15 | L-aspartic | Di-n-octyl | Setal ® 166 SS-80 | Tol ® HDT | 2.5 | 145 | Clear |
| 16* | L-alanine | Butyl | Actilane ® 890 + Actilane ® 424 | — | 400 | 26 | Clear |
| 17 | L-alanine | Butyl | Resin X | Tol ® HDT | 100 | 50 | Clear |
| 18 | L-alanine | Butyl | Setalux ® 1767 | Tol ® HDT | 150 | 18 | Clear | n.d. = not determined
*SCA prepared in Actilane ® 890, formulated with Actilane ® 424 to obtain 0.8 Pas high shear viscosity: wt % SCA in this formulation 0.75 wt %. Cured at room temperature with photo initiator and UV-radiation.

The invention claimed is:

1. A coating composition comprising:
   i) a binder, and
   ii) a rheology modification agent obtained by reacting one or more polyisocyanates with one or more optically active amino acid esters of the general formula (I)

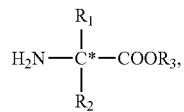

not as racemic mixture;
   wherein each of $R_1$ and $R_2$ is independently selected from the group consisting of hydrogen and a hydrocarbyl group, wherein the hydrocarbyl group is linear or cyclic or branched, substituted or unsubstituted, saturated or unsaturated, and optionally containing a heteroatom, with each of $R_1$ and $R_2$ being different such that the carbon atom C* is a chiral centre; and
   wherein $R_3$ is a hydrocarbyl group, wherein the hydrocarbyl group is linear or cyclic or branched, substituted or unsubstituted, saturated or unsaturated, and optionally containing a heteroatom.

2. A coating composition according to claim 1 wherein the one or more polyisocyanates are selected from the group consisting of: substituted or unsubstituted linear aliphatic polyisocyanates with an even number of carbon atoms in the chain between two isocyanate groups; dimers, trimers or biurets thereof substituted or unsubstituted arylene polyisocyanates; substituted or unsubstituted aralkylene polyisocyanates; and substituted or unsubstituted cyclohexylene polyisocyanates.

3. A coating composition according to claim 1 wherein the one or more optically active amino acid esters of formula (I) are esters of amino acids selected from the group of compounds consisting of:

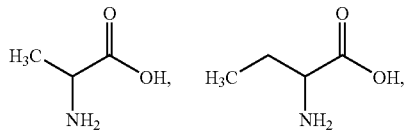

alanine (Ala)  amino butyric acid (Abu)

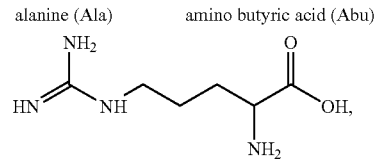

arginine (Arg)

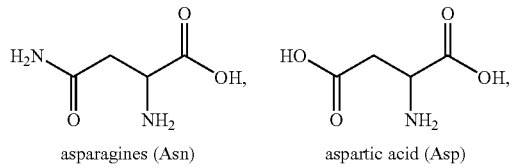

asparagines (Asn)  aspartic acid (Asp)

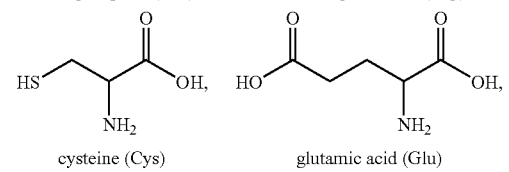

cysteine (Cys)  glutamic acid (Glu)

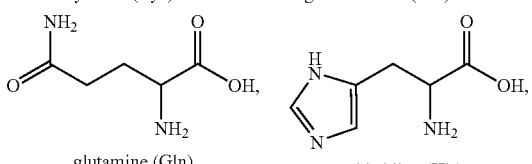

glutamine (Gln)  histidine (His)

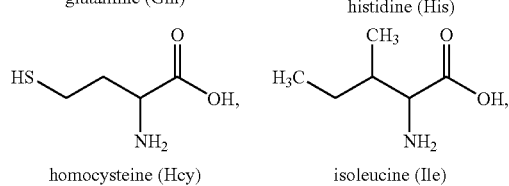

homocysteine (Hcy)  isoleucine (Ile)

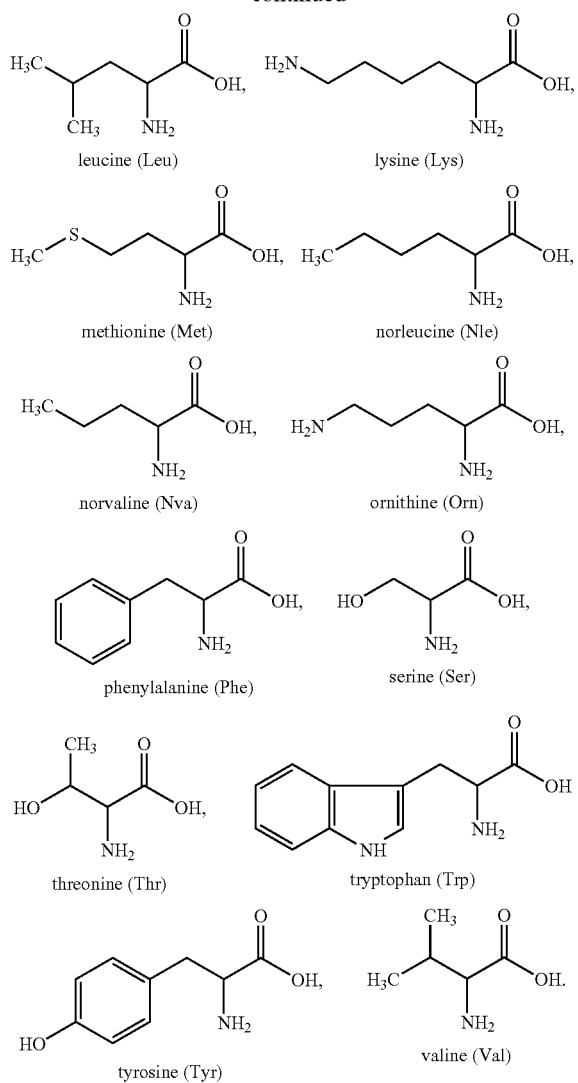

4. A coating composition according to claim 1 wherein $R_1$ and/or $R_2$ is a hydrocarbyl group, wherein the hydrocarbyl group is independently linear or cyclic or branched, substituted or unsubstituted, saturated or unsaturated, and optionally containing a heteroatom.

5. A coating composition according to claim 1 wherein $R_1$ and/or $R_2$ is a hydrocarbyl group independently selected from the group consisting of a linear or branched $C_1$-$C_{24}$ alkyl group, a linear or branched $C_1$-$C_4$ alkyl group, a methyl group, and an ethyl group.

6. A coating composition according to claim 1 wherein $R_3$ is a linear, cyclic or branched $C_{1-25}$ hydrocarbyl group selected from the group consisting of an alkyl group, an aryl group, an aralkyl group, and an alkenyl group; wherein said hydrocarbyl group is substituted or unsubstituted, saturated or unsaturated, and optionally containing a heteroatom.

7. A coating composition according to claim 1 wherein $R_3$ is a linear or branched $C_1$-$C_{25}$ alkyl group; wherein said hydrocarbyl group is substituted or unsubstituted, and optionally containing a heteroatom.

8. A coating composition according to claim 1 wherein $R_3$ is a linear or branched $C_1$-$C_8$ hydrocarbyl group selected from the group consisting of an alkyl group, an ether group, and an optionally esterified (poly)alkoxy group; wherein said hydrocarbyl group is substituted or unsubstituted.

9. A coating composition according to claim 1 wherein $R_3$ is a linear $C_1$-$C_4$ hydrocarbyl group selected from the group consisting of an alkyl group and an optionally alkoxylated alkoxy group.

10. A coating composition according to claim 1 wherein the coating composition is an isocyanate based coating composition.

11. A coating composition according to claim 1 wherein the coating composition is an acryloyl based coating composition.

12. A coating composition according to claim 1 wherein the coating composition is an epoxy curable coating composition.

13. A coating composition according to claim 1 wherein the coating composition is a dual curable coating composition.

14. A coating composition according to claim 1 wherein the coating composition is a isocyanate-reactive two-component (2K) coating system that is cured with one or more polyol compounds, thiol compounds, amine-functional compounds, or combinations thereof, at a temperature of at least 25° C. and below 150° C.

* * * * *